(12) United States Patent
Gabas Cebollero

(10) Patent No.: US 6,240,804 B1
(45) Date of Patent: Jun. 5, 2001

(54) SECURITY BRAKE MECHANISM FOR MOTOR VEHICLES

(75) Inventor: Carlos Gabas Cebollero, Barcelona (ES)

(73) Assignee: Fico Cables, S.A., Barcelona (ES)

( * ) Notice: Subject to any disclaimer, the term of this patent is extended or adjusted under 35 U.S.C. 154(b) by 0 days.

(21) Appl. No.: 09/424,154

(22) PCT Filed: May 5, 1998

(86) PCT No.: PCT/ES98/00121

§ 371 Date: Nov. 19, 1999

§ 102(e) Date: Nov. 19, 1999

(87) PCT Pub. No.: WO98/54037

PCT Pub. Date: Dec. 3, 1998

(30) Foreign Application Priority Data

May 26, 1997 (ES) .................................................... 9701131

(51) Int. Cl.[7] .................................................... G05G 5/06
(52) U.S. Cl. ................................................ 74/529; 74/535
(58) Field of Search ........................... 74/529, 535, 540, 74/512, 501.5 R

(56) References Cited

U.S. PATENT DOCUMENTS 5,546,828 * 8/1996 Golarz ................................ 74/529 X
6,122,990 * 9/2000 Bode et al. ............................ 74/535

FOREIGN PATENT DOCUMENTS

WO 9708027  3/1997  (WO) .

\* cited by examiner

*Primary Examiner*—Mary Ann Green
(74) *Attorney, Agent, or Firm*—Sughrue, Mion, Zinn, Macpeak & Seas, PLLC

(57) ABSTRACT

This mechanism includes a fixing device (5) comprising a fixing body (36) which meshes with toothing (34) of the support (1) and a helical fixing spring (37); a self-regulating device (3) comprising a traction body (11) to which is fixed the end of the steel cable (28) which links with the brake callipers or shoes attached to the mechanism, a spiral traction spring (12) and a helical locking spring (13), mounted coaxially to each other and so designed that, when the brake lever (2) is in the rest position, the spiral spring (12) subjects the cable (28) to traction, permanently adjusting the length of its sheathed portion; and a self-adjusting device (4) of the initial length of the cable (28) which includes a removable pin (32).

4 Claims, 5 Drawing Sheets

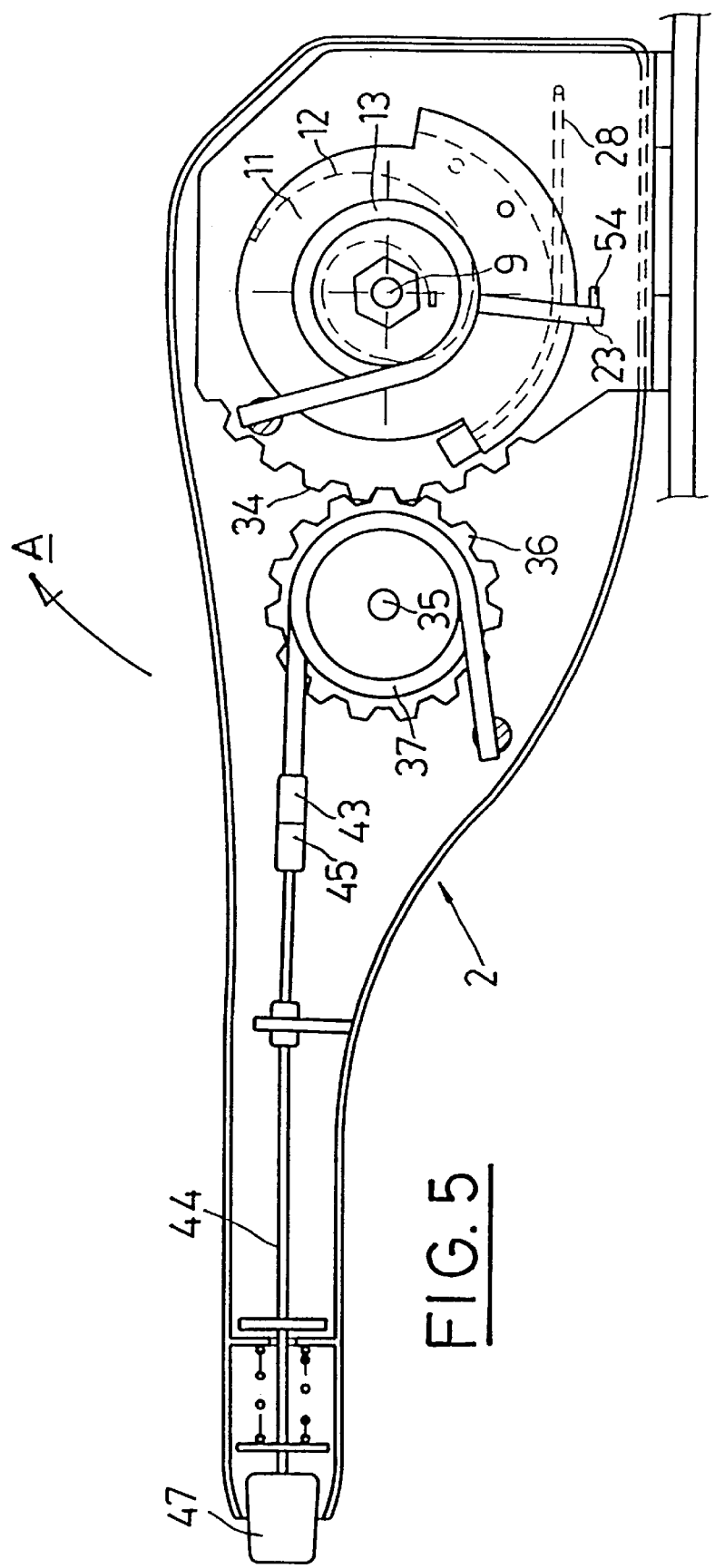

SECURITY BRAKE MECHANISM FOR MOTOR VEHICLES

TECHNICAL FIELD OF THE INVENTION

The object of the invention is a safety brake mechanism for automobile vehicles, of the type of safety brake also known as emergency brake habitually used to ensure immobilization of the vehicle when parked. The safety brake mechanism of the invention comprises a brake lever to which are fitted a self-adjusting device, a self-regulating device and a device for fixing the position reached by the brake lever during operation thereof by the user. The self-adjusting device is for initial adjustment of the length of the sheathed portion of steel cable of the control cable which links the brake mechanism of the invention with the mechanism which actuates the braking means of the wheels linked to the safety brake mechanism, such adjustment having the objective of taking up the tolerances presented by each particular vehicle as supplied ex-works in respect of the arrangement of said mechanisms; and the self-regulating device is for permanent and automatic adjustment of said sheathed portion of steel cable, this in order to compensate for wear of the braking elements, thereby maintaining the envisaged safety brake service conditions.

BACKGROUND OF THE INVENTION

Amongst the known embodiments of safety brake mechanisms whose structure includes a lever mounted in the driving compartment of the vehicle and operated by the user, whether by hand or by means of a pedal, a self-adjusting device, a self-regulating device and a device which fixes the rest or braking position of the lever when actuated by the user, it should be noted the device disclosed in the Spanish Patent Application No. P 9501758, equivalent to the European Patent Application No. 96923987.0 (EP 0 792 781 A).

The safety brake mechanism described in patent document PCT/ES96/00149 comprises in essence the elements detailed below. A support fixed to the structure of the vehicle and provided with retaining toothing; a brake lever attached by means of a pin for pivoting on the support, which brake lever can pivot between two positions, rest and braking respectively; a ratchet which comprises a lever fixed to the brake lever, the ratchet lever having one of its arms linked to a control device which can be actuated by the user and its other arm having a retaining extension which can mesh with the retaining toothing of the support in order to fix the position of the brake lever; a self-regulating device which comprises a traction body attached to the pivot pin of the brake lever and to which is fixed the corresponding end of the steel cable of the control cable, the traction body being able to pivot around said pin, a thrust body linked to the ratchet and couplable to the traction body during actuation of the brake lever, so that pivoting of the brake lever causes pivoting of the traction body, and a traction spring coaxially mounted with respect to the pivot pin of the brake lever which permanently imparts to the traction body a pivoting motion in the direction of traction of the steel cable; and a self-adjusting device comprising a pin which traverses the support and the traction body, fixing the position of each with respect to the other.

The operation of the safety brake mechanism according to patent document PCT/ES96/00149 is described below. The self-regulating device is supplied ex-works with the traction spring totally compressed; under these conditions, and once the mechanism has been mounted on the vehicle, initial adjustment of the length of the sheathed portion of cable consists in withdrawing the pin which fixes the position of the traction body, in such a way that the latter pivots and subjects the steel cable to traction to the extent required by each particular vehicle. On the basis of said initial adjustment, the self-regulating device then automatically and permanently adjusts the length of said sheathed portion; to that end, when the brake lever is in the rest position the traction spring permanently subjects the steel cable to traction, adjusting the length of its sheathed portion by pivoting of the traction body, so that when the brake lever is moved from the rest position to the braking position, the coupling of the thrust and traction bodies takes place in that position of the traction body for which the portion of sheathed cable is operative under the conditions pre-set ex-works. Fixing the braking position of the brake lever is implemented by meshing the retaining extension of the ratchet lever with the retaining toothing of the support, while passing from the braking position to the rest position is implemented by acting upon the ratchet control device.

The patent document JP-A-09024808 (Patent Abstracts of Japan, Vol. 97, No. 5) discloses a safety brake mechanism for automobile vehicles which includes a support, a brake lever linked to the support, a self-regulating device and a self-adjusting device for length of the portion of the sheathed steel cable, and a device for fixing the position of the brake lever.

In general, the known embodiments of safety brake mechanisms of the type described above have as their main disadvantage that they comprise a large number of components, which considerably increases brake mechanism manufacturing costs.

EXPLANATION OF THE INVENTION

A safety brake mechanism of new structure and functioning for automobile vehicles is made known hereby in order to provide a new embodiment of safety brake mechanism which, due to its relatively small number of components, is of lower production cost without thereby sacrificing any operational reliability.

The safety brake mechanism of the invention for automobile vehicles comprises:

- a support provided with means for fixing same to the structure of the vehicle;
- a brake lever attached to the support by means of a pivot pin, with the lever able to pivot about the pin in both directions between two positions, rest and braking positions respectively;
- a self-regulating device and a self-adjustment device for the length of the portion of sheathed steel cable of the control cable which links the safety brake mechanism with the actuating mechanism of the braking means of the vehicle wheels linked with the safety brake mechanism; and
- a device for fixing the position taken up by the brake lever.

The self-regulating device of the safety brake mechanism of the invention includes a traction body, a spiral traction spring and a helical locking spring in which:

- the traction body is of generally cylindrical shape and can pivot in both directions, having one traction end facing the support and one locking end, the traction body having means for fixing and guiding the corresponding end of the steel cable of the control cable;
- the spiral traction spring works permanently under torsion and has one of its ends fixed to the support; and
- the helical locking spring works permanently under torsion so that by elastic reaction it exercises a pressing action on the locking end of the traction body, with one of its ends fixed to the brake lever.

The safety brake mechanism of the invention is characterized in that:

the traction body, the spiral traction spring and the helical locking spring of the self-regulating device are coaxially arranged with respect to the pivot pin on which the brake lever pivots;

the traction end of the traction body has a cavity designed to receive the spiral traction spring, while the helical locking spring is coaxially arranged to the locking end of said traction body;

one end of the spiral traction spring is fixed to the traction body, in such a way that it permanently imparts to the traction body a pivoting force which subjects the steel cable to traction; and in that one end of the helical locking spring is linked to an opening stop mounted on the support, all of this so designed that:

when the brake lever is in the rest position, the opening stop pushes the corresponding end of the helical locking spring which is subjected to a torsion torque in a direction opposite to that of its elastic reaction pressing upon the locking end of the traction body, so that the latter can pivot by actuation of the traction spring exercising on the end of the steel cable a traction force which permanently and automatically adjusts the length of the portion of sheathed steel cable of the control cable, and when the brake lever is in a position other than the rest position, the opening stop ceases to exercise pressure on the end of the helical locking spring, so that the latter by elastic reaction exercises said pressing action on the locking end of the traction body which is attached to the brake lever in its movements from the rest position to the braking position and vice versa.

The self-adjusting device includes, on the brake lever, on the support and on the traction body, a respective through-orifice so arranged that, as supplied ex-works, when the brake lever is in the rest position with the traction spring subjected to torsion, said orifices are traversed by a retaining pin which immobilizes the brake lever and the traction body, all of this so designed that, when the safety brake mechanism is mounted on the vehicle with the corresponding end of the steel cable of the control cable attached to the fixing means of the traction body and to the other end of the steel cable attached to the actuating mechanism of the braking means, withdrawal of the retaining pin causes the traction body to pivot by elastic reaction of the spiral traction spring subjecting the steel cable to traction and leaving the length of the sheathed portion of the steel cable initially adjusted.

The device for fixing the position of the brake lever comprises:

on the support, fixing toothing arranged describing a circumference arc concentric to the pivot pin of the brake lever;

on the brake lever, a pivot pin to which is coupled coaxially a tubular fixing body with capacity for pivoting in both directions, the fixing body having a crown wheel which coincides with the toothing of the support, with which it is meshed permanently, so that pivoting of the brake lever from the rest position to the braking position, and vice versa, is implemented by pivoting of the fixing body around itself and the support;

a helical fixing spring coaxially mounted with respect to the fixing body and working permanently under torsion, so that by elastic reaction it subjects the fixing body to a pressing action, which helical fixing spring has one of its ends fixed to the brake lever, while its other end is attached to a control device, all of this so designed that:

when the brake lever is in the rest position, the pressing action of the helical fixing spring prevents pivoting of the fixing body, fixing the position of the brake lever, and movement of the brake lever from the rest position to the braking position, and vice versa, requires the application through the control device of a thrust action on the corresponding end of the helical fixing spring which is subjected to a torsion torque in a direction opposite to that of its elastic pressing action on the fixing body, so that the latter can pivot in the direction imposed by pivoting of the brake lever.

The control device is mounted inside the brake lever and includes an actuating rod on one of whose ends there is a control button which projects from the brake lever and can be actuated by the user, while its other end is attached to the end of the helical fixing spring.

BRIEF DESCRIPTION OF THE DRAWINGS

The drawing sheets of the present specification show the safety brake mechanism of the invention for automobile vehicles. In said drawings:

FIG. 5 is a side view in cross-section of the mechanism of the invention with the brake lever in the rest position.

DETAILED DESCRIPTION OF THE EXAMPLE OF EMBODIMENT

Figure 1:
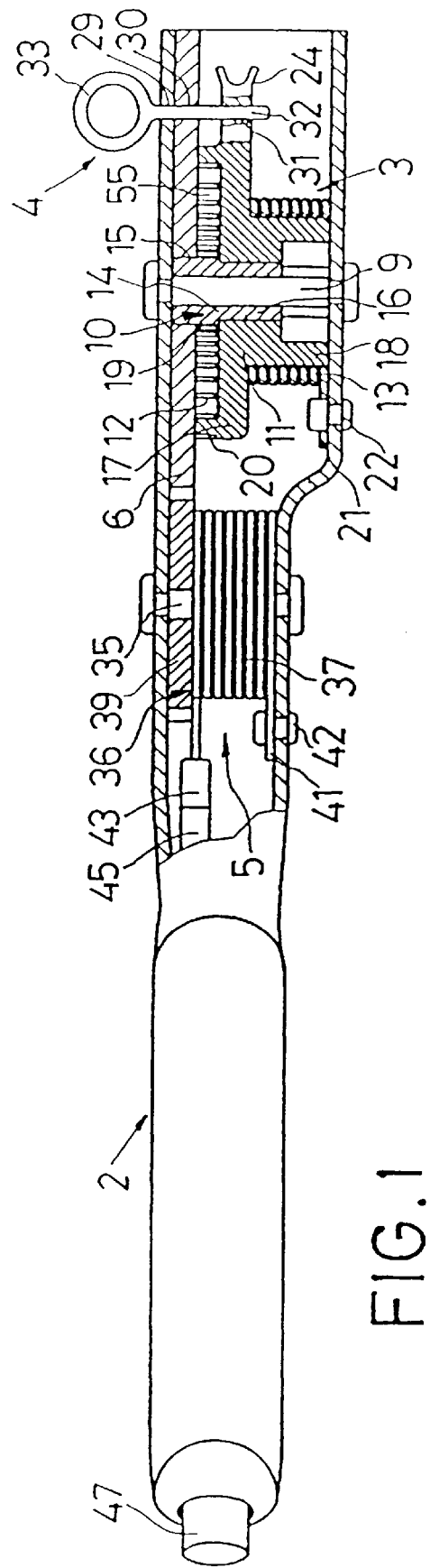
FIG. 1 is an upper view of the mechanism of the invention partially in cross-section.
Figure 2:
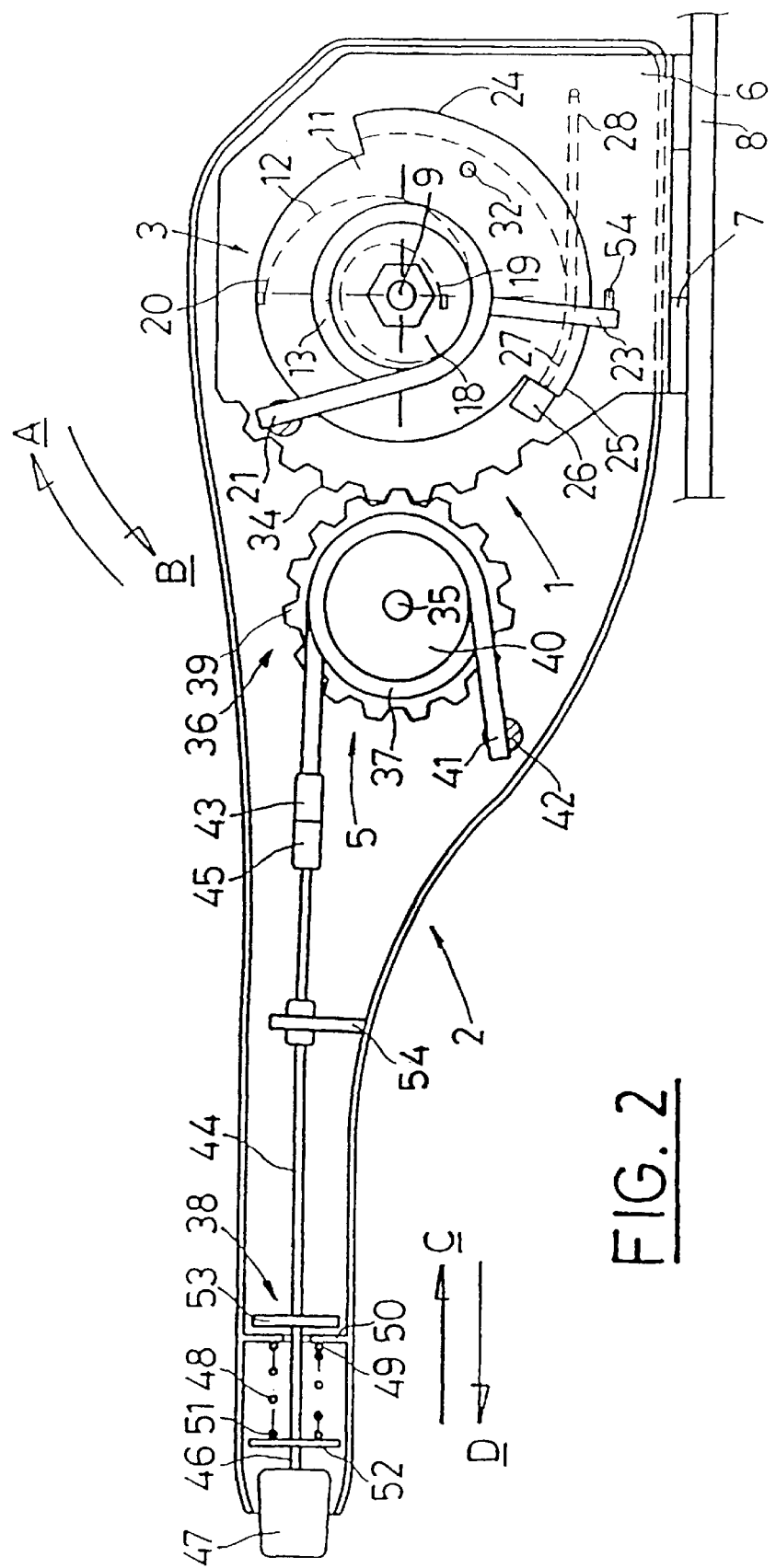
FIG. 2 is a side view in cross-section of the mechanism of the invention as supplied ex-works.
Figure 3:
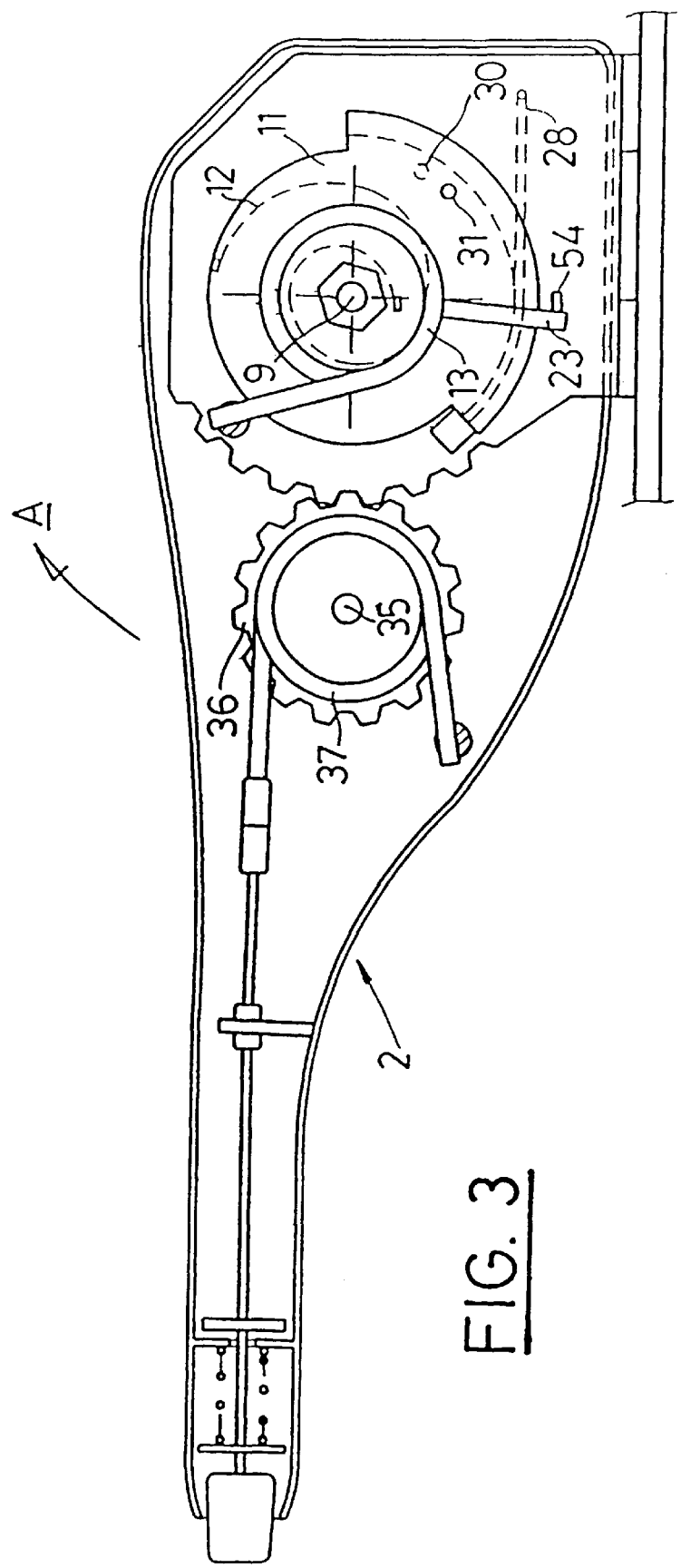
FIG. 3 is a side view in cross-section of the mechanism of the invention once the length of the sheathed portion of the control cable has been adjusted initially.
Figure 4:
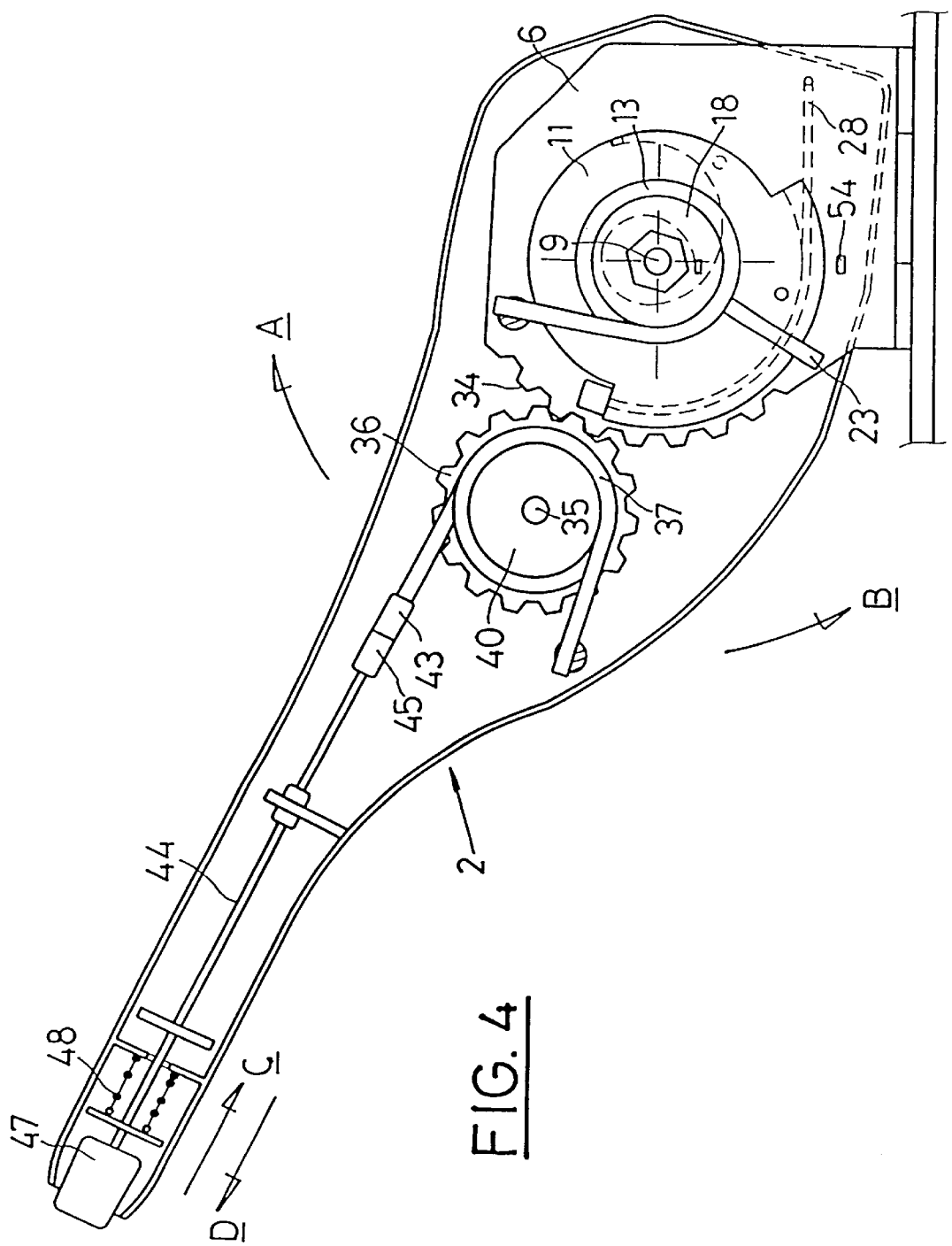
FIG. 4 is a side view in cross-section of the mechanism of the invention with the brake lever in braking position.

The description which follows of the example of embodiment of the safety brake mechanism of the invention refers to FIGS. 1 and 2, while the remaining FIGS. 3 to 5 refer to the mode of operation of the mechanism, so that FIGS. 3 to 5 show only those reference numbers which refer to said operation.

The brake mechanism includes a support 1, a brake lever 2, a self-regulating device 3, a self-adjusting device and a fixing device 5.

The support 1 includes a plate 6 provided with two extensions 7 for fixing to the structure 8 of the vehicle. The brake lever 2 and the plate 6 are attached by a pivot pin 9 in such a way that the brake lever 2 can be pivoted in both directions marked A and B in FIG. 2.

The self-regulating device 3 includes an intermediate body 10, a traction body 11, a spiral traction spring 12 and a helical locking spring 13, all of them coaxially mounted with respect to the pivot pin 9. FIG. 1 shows how the intermediate body 10 includes a first portion 14 of hexagonal cross-section coupled with a snug fit in a corresponding orifice 15 of hexagonal cross-section in the plate 6 of the support 1, and a second cylindrical portion 16, all of this so designed that the intermediate body 10 acts as sleeve of the pivot pin 9, said coupling preventing rotation of the intermediate body 10 around the pivot pin 9 of the gear lever 2. The traction body 11 is of generally cylindrical shape and has a traction end 17 opposite the plate 6 of the support 2 and a locking end 18, while the traction body can pivot in both directions marked as A and B in FIG. 2: on the traction end 17 there is a cavity 55 designed to receive the spiral traction spring 12 one of whose ends, the interior end 19, is fixed to the hexagonal portion 14 of the intermediate body 10, while its other end, the exterior end 20, is fixed to the traction body 11, with the spiral traction spring 12 working under torsion and in such a way that it tends to cause pivoting of the traction body 11 in the direction marked A in FIG. 2; coaxially mounted on the locking end 18 is the helical locking spring 13 which works under torsion and which by elastic reaction exercises a pressing action on the locking end 18 and consequently on the traction body 11, with one end of the locking spring 13, the end marked with reference number 21, fixed to the brake lever 2 by means of a pin 22, while its other end, the one marked with reference number 23, extends radially; and on the periphery of the traction end 17 there is a grooved radial extension 24 to one end of which, the interior end 25, is coupled a terminal 26 fixed to one end 27 of the steel cable 28 which links the safety brake mechanism of the invention with the mechanism which actuates the braking shoes or callipers of the vehicle wheels linked with the safety brake mechanism.

FIG. 1 shows how the self-adjusting device 4 has on the brake lever 2, on the plate 6 of the support 1 and on the grooved radial extension 24 of the traction body 11 respective through orifices 29, 30 and 31, and a fixing pin provided with a handle 33, all of this so designed that, when the brake lever 2 is in the rest position shown in FIG. 1, the pin 32 traverses said orifices 29, 30 and 31, leaving the traction body 11 immobilized.

The fixing device 5 includes: fixing toothing 34, a pin 35, a fixing body 36 and a helical fixing spring 37, coaxial to each other; and a control device 38. The fixing toothing 34 is on the periphery of the plate 6 of the support 1, describing a circumference arc. The pin 35 is fixed to the brake lever 2 and runs parallel to its pivot pin -9. The fixing body 36 is of generally cylindrical shape and has a crown wheel 39 fitted in coplanar fashion with respect to the plate 6 of the support 1 and a retaining end 40, the fixing body 36 being able to pivot in both directions marked A and B in FIG. 2; the crown wheel 39 is coupled to the fixing toothing 34 of the plate 6, in such a way that during pivoting of the brake lever 2 in directions A or B the fixing body 36 pivots around itself and around the pivot pin 9 of the brake lever 2; and coaxially mounted on the retaining end 40 is the helical fixing spring 37 which works under torsion and by elastic reaction exercises a pressing action on the retaining end 40 and consequently on the fixing body 36, with one end of the fixing spring 37, the end marked with reference number 41, being fixed to the brake lever 2 by means of a pin 42, while its other end, the one marked with reference number 43, is prolonged tangentially. The control device 38 includes an actuating rod 44 which rests by one of its ends, the interior end 45, on the tangential end 43 of the fixing spring 37, while on its other end, the exterior end 46, there is a control button 47 which can be actuated by the user, the rod having coaxially fitted around it a recoil spring 48 which works permanently under compression, with one of its ends, the interior end 49, resting against a partition plate 50, and its other end, the exterior end 51, resting against a projection 52 from the rod 44; moreover, the rod 44 has a stop 53 and a guide-support 54, all so designed that the actuating rod 44 can travel in the directions marked as C and D in FIG. 2.

The safety brake mechanism of the invention described as an example of embodiment is supplied ex-works as shown in FIG. 2, in which condition: the lever arm 2 is in the rest position; the fixing spring 37 exercises its pressing action on the retaining end 40 of the fixing body 36, preventing its pivoting around the pin 35, so that the brake lever 2 is immobilized; the radial interior end 23 of the locking spring 13 rests on a stop 54 fixed to the plate 6 of the support 1, in such a way that the locking spring 13 is subjected to a torque of opposite direction to that of its pressing action on the locking end 18 of the traction body 11, thus making it possible for the traction body 11 to pivot around the pivot pin 9 of the brake lever 2; the spiral traction spring 12 is totally compressed; and the retaining pin 32 is positioned so that it traverses the through-orifices 29, 30 and 31 of the brake lever 2, the plate 6 of the support 1 and the traction body 11 respectively, immobilizing them in relation to each other.

Once the safety brake mechanism has been mounted on the automobile vehicle, that is, once the mechanism has been fixed through its support 1 to the structure of the vehicle and the end (not shown) of the steel cable 28 fixed to the actuating mechanism of the brake shoes or callipers of the wheels linked to the safety brake, the operation of the safety brake mechanism of the invention is as described below.

Firstly, the length of the sheathed portion of the steel cable 28 (not shown) is adjusted initially; to that end, the fixing pin 32 has simply to be withdrawn from the orifices 29, 30 and 31, in which situation, as shown in FIG. 3: the brake lever 2 is kept immobilized by the pressing action of the fixing spring 37 which prevents pivoting of the fixing body 36 around the pin 35; the action of the stop 54 on the locking spring 13 permits pivoting of the traction body 11 around the pivot pin 9, so that, driven by the spiral traction spring 12, it pivots in the direction marked A, submitting the steel cable 28 to traction, and said pivoting continues until the traction action of the spiral spring 12 is cancelled out by the reaction of said sheathed portion of steel cable 28 (not shown), leaving the length of said sheathed portion adjusted and the safety brake mechanism in the envisaged service conditions.

The movement of the brake lever 2 from the rest position to the braking position simply requires a thrust from the control button 47 in the direction marked C, at the same time as the brake lever 2 is pushed and pivoted in the direction marked A, in which situation: the actuating rod 44, by its interior end 45, imparts to the fixing spring 37 a torque in the opposite direction to that of its pressing action on the retaining end 40, so that the fixing body 36 can pivot around the pin 35 and around the pivot pin 9 of the brake lever 2, meshing with the fixing toothing 34 of the plate 6 of the support 1; when the brake lever 2 begins to pivot in the direction marked A, the stop 54 ceases to exercise its action on the radial interior end 23 of the locking spring 13, so that by elastic reaction the latter then exercises pressure on the locking end 18, and consequently on the traction body 11, which is thus attached to the brake lever 2 and pivots with same around the pivot pin 9, thereby subjecting the steel cable 28 to traction; and when the brake lever reaches the braking position shown in FIG. 4, when pressure on the control button 47 ceases, the elastic reaction of the coil spring 48 moves the actuating rod in the direction marked D and the action of its interior end 45 on the end 43 of the fixing spring 37 ceases, so that, by elastic reaction, the fixing spring 37 exercises its pressing action on the retaining end 40, and consequently on the fixing body 36, which is immobilized and prevents pivoting of the brake lever 2, leaving the vehicle braked by the traction action of the steel cable 28.

Movement of the brake lever 2 from the braking position shown in FIG. 4 to the rest position shown in FIG. 5 requires pressing of the control button 47 in the direction marked C, while the brake lever 2 is pressed in the direction marked B, in which situation: the actuating rod 44 and its interior end 45 act upon the fixing spring 37 in the manner described above, so that the fixing body 36 can pivot around the pin 35 and around the pivot pin 9 of the brake lever 2, meshing with the fixing toothing 34; during the pivoting of the brake lever 2 from the braking position to the rest position, the locking spring 13 maintains its pressing action on the traction body 11 which, pivoting around the pivot pin 9 of the brake lever 2, remains attached to the latter, so that the steel cable 28 is acted upon by said actuating mechanism of the brake shoes or callipers; and, when the brake lever 2 reaches the rest position shown in FIG. 5 and action on the control button 47 ceases, the safety brake mechanism returns to the initial service condition described, that is: when the action of the interior end 45 of the actuating rod 44 on the end 43 of the fixing spring 37 ceases, the latter exercises its pressing action on the retaining end 40 of the fixing body 36, which is immobilized; and the stop 54 exercises its action on the end 23 of the locking spring 13, releasing the traction body 11 which, driven by the spiral traction spring 12, pivots in the direction marked A, subjecting the steel cable 28 to traction and, consequently, automatically regulating the length of the sheathed portion of the steel cable 28, thereby compensating for wear of said brake shoes and callipers.

What is claimed is:

1. Safety brake mechanism for automobile vehicles, comprising:
    a support (1) provided with a means (7) for fixing same to a structure (8) of a vehicle;
    a brake lever (2) attached to the support (1) by means of a pivot pin (9), with a lever (2) able to pivot in both directions between two positions, rest and braking;
    a self-regulating device (3) and a self-adjustment device (4) for a length of a portion of sheathed steel cable (28) of a control cable; and
    a device (5) for fixing the positions taken up by the brake lever (2);
    the self-regulating device (3) includes a traction body (11), a spiral traction spring (12) and a helical locking spring (13) in which:
    the traction body (11) is of generally cylindrical shape and can pivot in both directions, having one traction end (17) facing the support (1) and one locking end (18), the traction body (11) having means for fixing and guiding a corresponding end (27) of the steel cable (28) of the control cable;
    the spiral traction spring (12) works permanently under torsion and has one of its ends (19) fixed to the support (1); and
    the helical locking spring (13) works permanently under torsion so that by elastic reaction it exercises a pressing action on the locking end (18) of the traction body (11), with one of its ends (21) fixed to the brake lever (2), and wherein:
    the traction body (11), the spiral traction spring (12) and the helical locking spring (13) of the self-regulating device are coaxially arranged with respect to the pivot pin (9) on which the brake lever (2) pivots;
    the traction end (17) of the traction body (11) has a cavity (55) designed to receive the spiral traction spring (12), while the helical locking spring (13) is coaxially arranged to the locking end (18) of said traction body (11);
    one end (20) of the spiral traction spring (12) is fixed to the traction body (11), in such a way that it permanently imparts to the traction body (11) a pivoting force which subjects the steel cable (28) to traction; and in that
    one end (23) of the helical locking spring (13) is linked to an opening stop (54) mounted on the support (1),
    all of this so designed that:
    when the brake lever (2) is in the rest position, the opening stop (54) pushes the end (23) of the helical locking spring (13) which is subjected to a torsion torque in a direction opposite to that of its elastic reaction pressing upon the locking end (18) of the traction body (11), so that the latter can pivot by actuation of the traction spring (12) exercising on the end (27) of the steel cable (28) a traction force which permanently and automatically adjusts the length of the portion of the sheathed steel cable of the control cable, and
    when the brake lever (2) is in a position other than the rest position, the opening stop (54) ceases to exercise pressure on the end (23) of the helical locking spring (13), so that the latter by elastic reaction exercises said pressing action on the locking end (18) of the traction body (11) which is attached to the brake lever (2) in its movements from the rest position to the braking position and vice versa; and
    wherein the self-adjustment device (4) includes, on the brake lever (2), on the support (1), and on the traction body (11), respective through orifices (29, 30, 31) so arranged that, as supplied ex-works, when the brake lever (2) is in the rest position with the traction spring (12) subjected to torsion, said orifices (29, 30, 31) are traversed by a retaining pin (32) which immobilizes the brake lever (2) and the traction body (12), all of this so designed that,
    when the safety brake mechanism is mounted on the vehicle with the end (27) of the steel cable (28) of the control cable attached to the fixing means of the traction body (11) and the other end of the steel cable (28) attached to the actuating mechanism of the braking means, withdrawal of the retaining pin (32) causes the traction body (11) to pivot by elastic rotation of the spiral traction spring (12) subjecting the steel cable (28) to traction and leaving the length of the sheathed portion of the steel cable initially adjusted.

2. Safety brake mechanism as claimed in claim 1, characterized in that the control device (38) is mounted inside the brake lever (2) and includes an actuating rod (44) on one of whose ends (46) there is a control button (47) which projects from the brake lever (2) and can be actuated by the user, while its other end (45) is attached to the end (43) of the helical fixing spring (37).

3. Safety brake mechanism as claimed in claim 1, characterized in that the device (5) for fixing the position of the brake lever (2) comprises:
    on the support (1), fixing toothing (34) arranged describing a circumference arc concentric to the pivot pin (9) of the brake lever (2);
    on the brake lever (2), a pivot pin (35) to which is coupled coaxially a tubular fixing body (36) with capacity for pivoting in both directions, the fixing body (36) having a crown wheel (39) which coincides with the toothing (34) of the support (1), with which it is meshed permanently, so that pivoting of the brake lever (2) from the rest position to the braking position, and vice versa, is implemented by pivoting of the fixing body (36) around itself and the support (1);

a helical fixing spring (37) coaxially mounted with respect to the fixing body (36) and working permanently under torsion, so that by elastic reaction it subjects the fixing body (36) to a pressing action, which helical fixing spring (37) has one of its ends (41) fixed to the brake lever (2), while its other end (43) is attached to a control device (38), all of this so designed that:

when the brake lever (2) is in the rest position, the pressing action of the helical fixing spring (37) prevents pivoting of the fixing body (36), fixing the position of the brake lever (2), and movement of the brake lever (2) from the rest position to the braking position, and vice versa, requires the application through the control device (38) of a thrust action on the corresponding end (43) of the helical fixing spring (37) which is subjected to a torsion torque in a direction opposite to that of its elastic pressing action on the fixing body (36), so that the latter can pivot in the direction imposed by pivoting of the brake lever (2).

4. Safety brake mechanism as claimed in claim 3, characterized in that the control device (38) is mounted inside the brake lever (2) and includes an actuating rod (44) on one of whose ends (46) there is a control button (47) which projects from the brake lever (2) and can be actuated by the user, while its other end (45) is attached to the end (43) of the helical fixing spring (37).

* * * * *